(12) United States Patent
Pendergast

(10) Patent No.: US 12,030,556 B2
(45) Date of Patent: Jul. 9, 2024

(54) BEVEL GEAR BOX FOR STEERING DRIVE LINE

(71) Applicant: STEERING DRIVELINES AUSTRALIA PTY LTD, Laverton North (AU)

(72) Inventor: Michael Pendergast, Laverton North (AU)

(73) Assignee: STEERING DRIVELINES AUSTRALIA PTY LTD, Laverton North (AU)

( * ) Notice: Subject to any disclaimer, the term of this patent is extended or adjusted under 35 U.S.C. 154(b) by 0 days.

(21) Appl. No.: 17/759,463

(22) PCT Filed: Feb. 25, 2021

(86) PCT No.: PCT/AU2021/050159
§ 371 (c)(1),
(2) Date: Jul. 26, 2022

(87) PCT Pub. No.: WO2021/168510
PCT Pub. Date: Sep. 2, 2021

(65) Prior Publication Data
US 2023/0056063 A1 Feb. 23, 2023

(30) Foreign Application Priority Data
Feb. 27, 2020 (AU) ............................... 2020900575

(51) Int. Cl.
*B62D 3/02* (2006.01)
*F16H 1/14* (2006.01)
(Continued)

(52) U.S. Cl.
CPC ................ *B62D 3/02* (2013.01); *F16H 1/14* (2013.01); *F16H 57/021* (2013.01);
(Continued)

(58) Field of Classification Search
CPC .... F16H 57/021; F16H 57/023; F16H 57/038; F16H 2057/02017; F16H 2057/02043; B62D 1/16; B62D 1/20
See application file for complete search history.

(56) References Cited

U.S. PATENT DOCUMENTS 3,802,289 A * 4/1974 Cheek .................. F16H 57/021
74/606 R
4,282,765 A * 8/1981 Ashauer .................. B62D 1/20
74/400

(Continued)

FOREIGN PATENT DOCUMENTS

CN 206299751 U 7/2017
DE 112008002217 T5 * 7/2010 ............. F16H 48/08
JP H0743520 Y2 10/1995

OTHER PUBLICATIONS

Corless, Differential With Balance Bolt Retention System And Assembly Procedure, Jul. 15, 2010, DE 11 2008 002 217 T5, Machine Translation of Description (Year: 2010).*

(Continued)

*Primary Examiner* — James A English
(74) *Attorney, Agent, or Firm* — Westman, Champlin & Koehler, P.A.

(57) ABSTRACT

The invention relates to a bevel gear box for use as part of the steering mechanism of a commercial vehicle. The invention may be suited to use where the controlled axles of the vehicle are located below the passenger compartment. The bevel gear box may comprise box housing, which in turn houses two separate bevel gear barrel assemblies. The exemplified bevel gear barrel assemblies each comprise a bevel gear, the bevel gear further comprising a gear head incorporating teeth and a gear shaft. Shaft housing surrounds a circumference of gear shaft. To enable the bevel gear to rotate within the shaft housing, bearings may be placed (Continued)

between surfaces of the bevel gear and the shaft housing. The face of the gear head may comprise a gear head recess for location of a center dowel therein.

28 Claims, 6 Drawing Sheets

(51) Int. Cl.
  *F16H 57/021* (2012.01)
  *F16H 57/023* (2012.01)
  *F16H 57/038* (2012.01)
  *F16H 57/02* (2012.01)
(52) U.S. Cl.
  CPC ......... *F16H 57/023* (2013.01); *F16H 57/038* (2013.01); *F16H 2057/02082* (2013.01)

(56) References Cited

U.S. PATENT DOCUMENTS

| | | | |
|---|---|---|---|
| 4,742,725 A * | 5/1988 | Nagai | B62D 3/02 |
| | | | 74/417 |
| 7,188,543 B1 | 3/2007 | Andrews et al. | |
| 9,555,825 B2 | 1/2017 | Vomering et al. | |
| 2006/0027416 A1 * | 2/2006 | Mizuhara | B62D 5/0421 |
| | | | 180/444 |
| 2006/0048595 A1 | 3/2006 | Obermeier | |

OTHER PUBLICATIONS

International Search Report and Written Opinion in corresponding International Application No. PCT/AU2021/050159 dated Apr. 27, 2021.

* cited by examiner 9A  9B

BEVEL GEAR BOX FOR STEERING DRIVE LINE

CROSS-REFERENCE TO RELATED APPLICATIONS

The present application is a Section 371 National Stage Application of International Application No. PCT/AU2021/050159, filed Feb. 25, 2021 and published as WO 2021/168510 A1 on Sep. 2, 2021, in English, and further claims priority to Australian patent application serial no. 2020900575, filed Feb. 27, 2020.

FIELD

The present invention is generally directed a bevel gar box for a steering drive line assembly.

BACKGROUND

Bevel gear boxes form a common part of the steering mechanism of commercial vehicles, particularly where the controlled axles of the vehicle are located below the passenger compartment, as is the case for many trucks, vans and buses.

In such vehicles, steering input from a steering wheel is transmitted via steering shafts to a steering mechanism (such as a steering gear). The steering shafts are configured to rotate with the steering wheel to so transmit the steering input. Due to the configuration of a given vehicle, steering shafts may be orientated along different axes to one another so as to change the operating angle from the steering column. For example, a first steering shaft may be orientated substantially vertically to receive rotational input from a steering wheel, while a second steering shaft may be orientated substantially horizontally to transmit rotational input to a steering gear. To enable change of the operating angle, a bevel box may be located between the steering shafts to transmit rotational input from one steering shaft to the other.

FIG. 1 demonstrates a steering arrangement 100 according to the above general description. The steering arrangement 100 generally includes a steering wheel 102, a first steering shaft 104 orientated substantially vertically, a bevel box 106, a second steering shaft 108 orientated substantially horizontally, and a steering gear 110. The bevel box 106 transmits rotational input from the first steering shaft 104 to the second steering shaft 108 to be received by the steering gear 110.

FIG. 2 demonstrates a bevel gear box 200 in a generally common configuration as disclosed in U.S. Pat. No. 9,555,825 B2 (the entire disclosure of which is hereby incorporated). The bevel box 200 comprises an outer casing 201, which houses a first bevel gear 202A, and a second bevel gear 202B. The first bevel gear 202A comprises teeth 203A which mesh with teeth 203B of the second bevel gear 202B. Each bevel gear 202A, 202B has the same number of teeth, providing a 1:1 gear ratio. The first bevel gear 202A and second bevel gear 202B each respectively comprise stub shafts 204A, 204B, which end in splined sections 205A, 205B to enable the stub shafts 204A, 204B to connect to further steering shafts, via for example sleeve 206. Not shown are bearings located in the casing 201, enabling rotation of each bevel gear 202A, 202B relative the casing 201. Commonly, alignment of the two gears 202A and 202B during assembly of the bevel box 200 can require considerable effort and expertise. For example, optimal positioning may require considerable manual handling, thereby slowing manufacture, repair and restoration of bevel box 200. Additionally, sub-optimal positioning of bearings, and limitations on where bearings may be placed, will further affect the smooth operation of the bevel box 200 (e.g. increasing friction against the casing 200 or grind on gear teeth 203A, 303B). Given the difficulties in ensuring appropriate positioning and alignment, bevel boxes of the type utilised in steering drive lines comprise straight teethed gears, which allow relatively easy alignment but are thought to create noise, vibration, excess drag, loss of efficiency and back lash.

The preferred embodiments of the present invention seek to address one or more of these disadvantages, and/or to at least provide the public with a useful alternative.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

According to a first aspect of the invention, there is provided a bevel gear barrel assembly for insertion into a bevel gear box, the barrel assembly comprising:
  a bevel gear, the bevel gear comprising a gear head incorporating gear teeth, and a gear shaft extending from the gear head;
  a shaft housing surrounding a circumference of the gear shaft such that the gear head extends from the shaft housing; and
  a first radial bearing, the first radial bearing located between the gear shaft and the shaft housing.

In an embodiment, the shaft housing comprises a first radial bearing recess for locating the first radial bearing at least partially therein.

In an embodiment, the first radial bearing comprises a roller bearing, optionally a needle roller bearing.

In an embodiment, the barrel assembly further comprises a first axial bearing, the first axial bearing located between the gear head and the shaft housing.

In an embodiment, the shaft housing comprises a first axial bearing recess for locating the first axial bearing at least partially therein.

In an embodiment, the first axial bearing comprises a roller bearing, optionally a needle roller bearing.

In an embodiment, the shaft housing comprises a collar projection about a circumference of the shaft housing to limit insertion of the bevel gear barrel assembly into a bevel gear box.

In an embodiment, the gear head comprises a gear head face surrounded by the gear teeth, wherein the gear head face comprises a gear head recess enabling a centre dowel to be inserted therein.

In an embodiment, the barrel assembly further comprises:
  a centre dowel located in the gear head recess;
  a second radial roller bearing, the second radial bearing located between a circumference of the centre dowel and the recess.

In an embodiment, the gear head recess comprises a second radial roller bearing recess for locating the second radial bearing at least partially therein.

In an embodiment, the second radial bearing comprises a roller bearing, optionally a needle roller bearing.

In an embodiment, the barrel assembly comprises a second axial bearing surrounding a circumference of the centre dowel and contacting the gear head face.

In an embodiment, the gear head recess comprises a second axial bearing recess for locating the second axial bearing at least partially therein.

In an embodiment, the second axial bearing comprises a roller bearing, optionally a needle roller bearing.

In an embodiment, barrel assembly further comprises a seal configured to seal between the gear shaft and the shaft housing, at the opposite end of the shaft housing to the gear head.

In an embodiment, the gear head comprises angled gear teeth.

In an embodiment, the gear head comprises spiraled gear teeth.

In an embodiment, the pitch angle of the gear teeth is between 30°-60°, optionally the pitch angle of the teeth is 45°.

In an embodiment, the barrel assembly is configured to slide into a bevel gear box.

According to a second aspect of the invention, there is provided a box casing for a bevel gear box, the box casing comprising at least two barrel recesses, each barrel recess configured for insertion therein of a barrel assembly according to a first aspect of the invention.

In an embodiment, the at least two barrel recesses are set at 45°-135° with respect to one another, optionally 60°-120° with respect to one another, optionally 90° with respect to one another.

A In an embodiment, the box casing further comprises a locking means to lock a barrel assembly inserted into a barrel recess in place.

In an embodiment, the locking means comprises an aperture for insertion therein of a locking pin, optionally a roll pin.

According to a third aspect of the invention, there is provided a bevel gear box comprising:
  a box casing according to a second aspect of the invention; and
  two bevel gear barrel assemblies, each bevel gear barrel assembly according to a first aspect of the invention, wherein each bevel gear barrel assembly is inserted into a respective barrel recess of the box casing.

In an embodiment, the bevel gears of each bevel gear barrel assembly possess a gear ratio of 1:1 with respect to one another.

In an embodiment, the bevel gear box is incorporated into the steering drive line of a vehicle.

In an embodiment, the bevel gear box is incorporated into the steering drive line of a truck.

According to a fourth aspect of the invention, there is provided a method of producing a bevel gear box, the method comprising:
  locating a box casing according to a second aspect of the invention; and
  inserting a first bevel gear barrel assembly according to a first aspect of the invention into a first barrel recess of the box assembly; and
  inserting a second bevel gear barrel assembly according to a first aspect of the invention into a second barrel recess of the box assembly.

In an embodiment, the method further comprises:
  locking the first bevel gear barrel assembly into the first barrel recess; and
  locking the second gear barrel assembly into the second barrel recess.

According to a fifth aspect of the invention, there is provided a bevel gear box for incorporation into the steering drive line of a vehicle, the bevel gear box comprising: a first bevel gear and a second bevel gear, wherein the first bevel gear and the second bevel gear comprise spiraled teeth.

In an embodiment, the bevel gear box is incorporated into the steering drive line of a vehicle.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and widely differing embodiments and applications of the present invention will suggest themselves without departing from the scope of the present invention as defined in the appended claims. The disclosures and the descriptions herein are purely illustrative and are not intended to be in any sense limiting. Where specific integers are mentioned herein, which have known equivalents in the art to which this invention relates; such known equivalents are deemed to be incorporated herein as if individually set forth.

As used herein the term '(s)' following a noun means the plural and/or singular form of that noun. Further, as used herein the term 'and/or' means 'and' or 'or', or where the context allows both. The invention consists in the foregoing and also envisages constructions of which the following gives examples only.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

Furthermore, terms such as "side," "end," "top," "bottom," and the like are only used to describe elements as they relate to one another, but are in no way meant to recite specific orientations of the device, to indicate or imply necessary or required orientations of the device, or to specify how the invention described herein will be used, mounted, displayed, or positioned in use.

Figure 1:
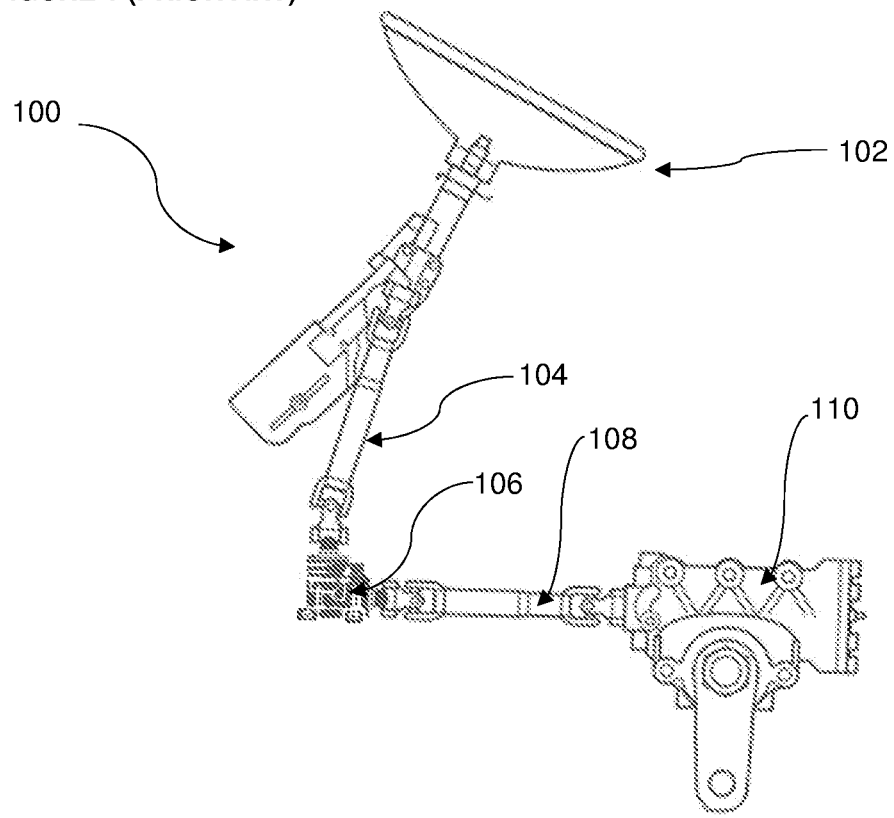
FIG. 1 shows a steering mechanism for a commercial vehicle, incorporating a bevel gear box according to existing technologies.

While the above-identified figures set forth one or more embodiments of the present invention, other embodiments are also contemplated as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

LIST OF COMPONENTS

1—box housing
2—shaft housing
3—bevel gear
4—gear shaft
5—gear head
6—gear head recess
7—teeth
8—centre dowel
9—shim washer
10—roll pin
11—second axial bearing
12—bearing washer
13—first axial bearing
14—bearing washer
15—second radial bearing
16—first radial bearing
17—seal
18—bevel gear barrel assembly
19—housing recess
20—shaft housing chamfer
21—splined end
22—outer collar protrusion
23—first radial bearing recess
24—first axial bearing recess
25—second radial bearing recess
26—second axial bearing recess

DETAILED DESCRIPTION

In broad terms, the present invention relates to a bevel gear barrel assembly for insertion into a bevel gear box, a method of producing a bevel gear barrel assembly, a bevel gear box, and a method of producing a bevel gear box, steering drive line comprising a bevel gear box. Within the broader concept, various embodiments of the bevel gear barrel assembly, bevel gear box, steering drive line and methods producing each are described and defined with further detail below. Moreover, within the description and the figures, reference to like numbers denotes reference to like features.

Figure 3:
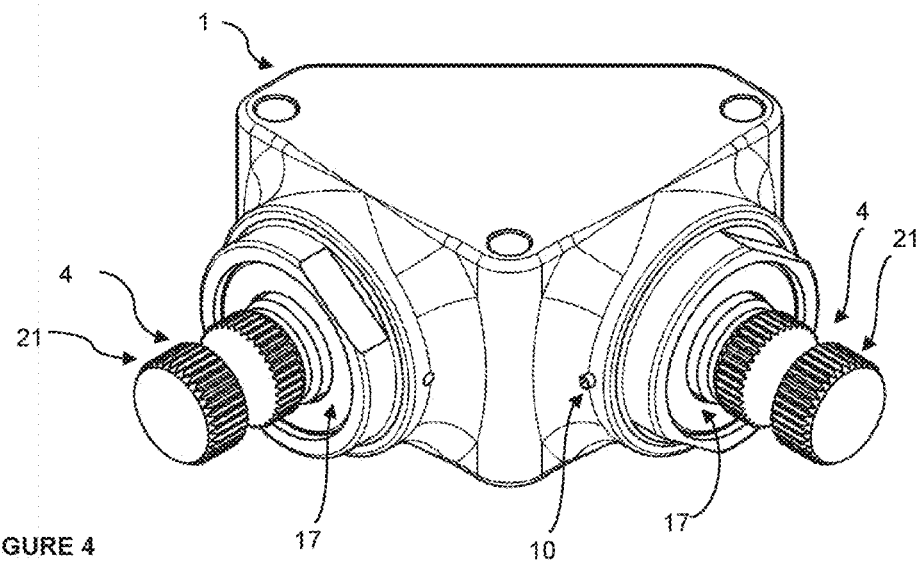
FIG. 3 shows a bevel gear box according to an embodiment of the invention.
Figure 4:
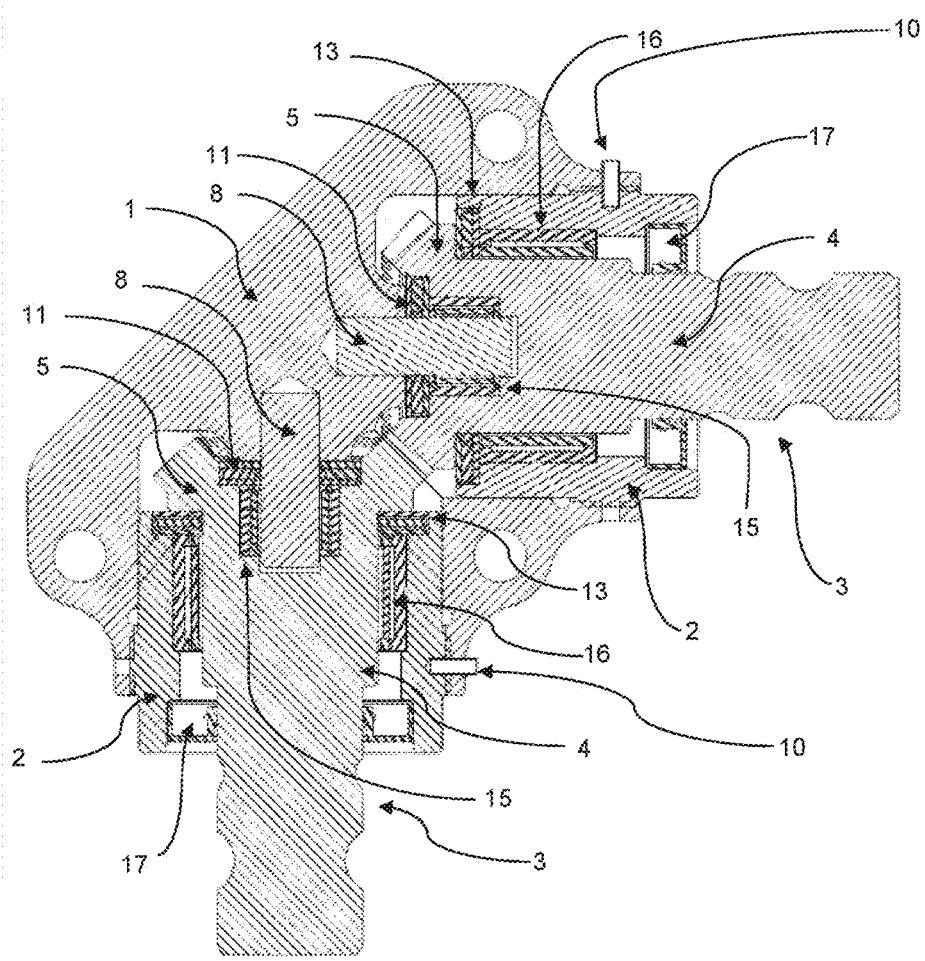
FIG. 4 shows a cutaway section view of the bevel gear box of FIG. 3.
Figure 5:
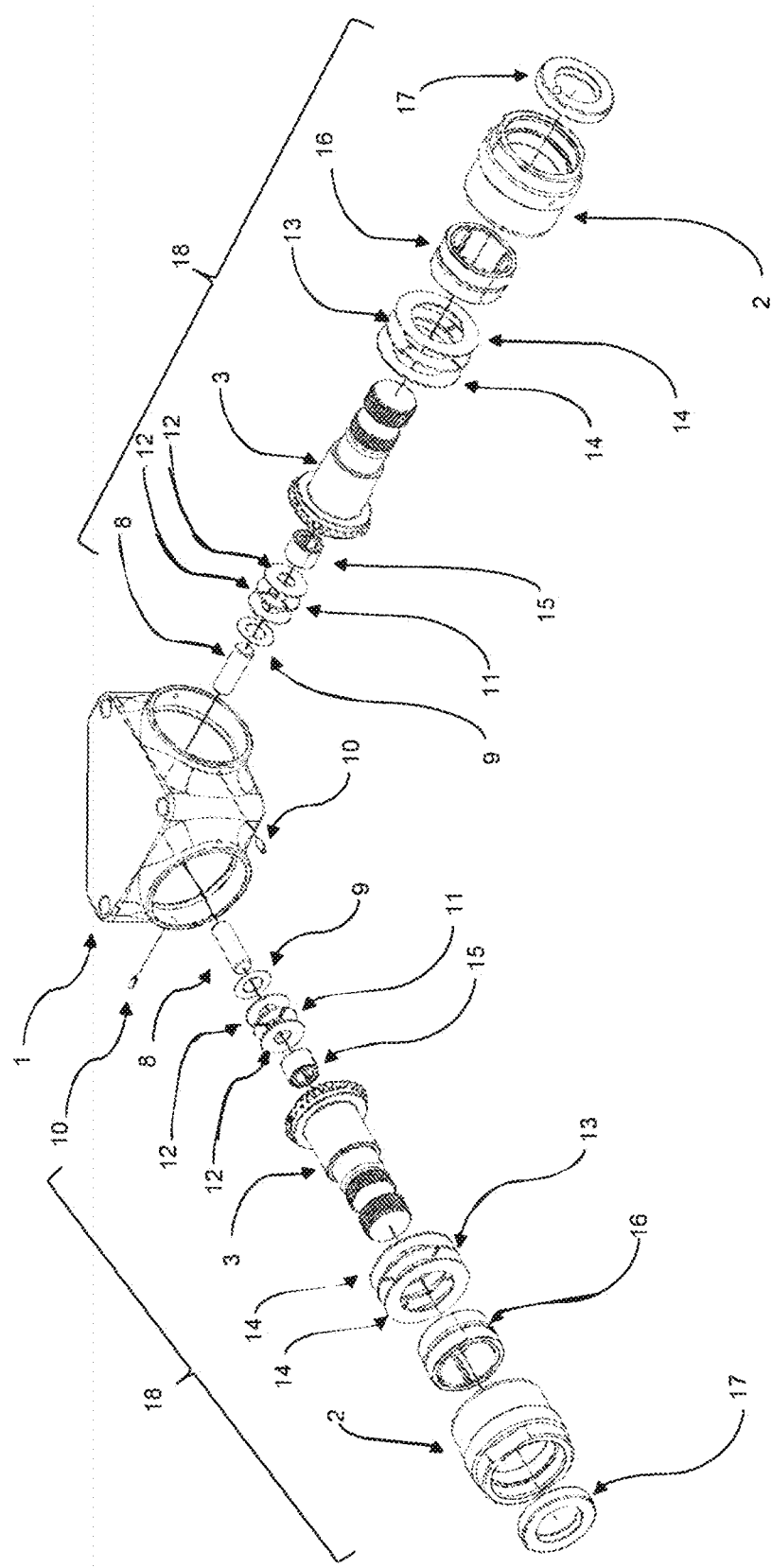
FIG. 5 shows an exploded view of the bevel gear box of FIG. 3.

Referring to FIG. 3 to FIG. 5, an embodiment is provided including a bevel gear box, suitable for incorporation into a steering drive line. The bevel gear box comprises box housing 1, which houses two separate bevel gear barrel assemblies 18. In the embodiment shown, the two bevel gear barrel assemblies are aligned perpendicular to one another to transmit rotational at an angle of 90°. While an angle of 90° is exemplified, other angles are expressly contemplated, including for example angles in the range between 450-135° or between 60°-120°.

The exemplified bevel gear barrel assemblies 18 each comprise a bevel gear 3, the bevel gear 3 further comprising a gear head 5 incorporating teeth 7 and a gear shaft 4. Shaft housing 2 surrounds a circumference of gear shaft 4. To enable the bevel gear 3 to rotate within the shaft housing 2, bearings 13, 16 may be placed between surfaces of the bevel gear 3 and the shaft housing 2. According to the embodiment shown, a first radial bearing 16 is located between an outer circumference of the gear shaft 4 and the shaft housing 2. The first radial bearing 16 locates the gear shaft 4 within shaft housing 2, and reduces friction between the gear shaft 4 and the shaft housing 2 as the bevel gear 3 rotates within the shaft housing Further, a first axial bearing 13, surrounded by bearing washers 12, is located between the bevel gear head 5 and the shaft housing 2. The first axial bearing 13 locates the gear head 5 against an end of the shaft housing 2, while reducing friction as the gear head 5 rotates against the shaft housing 2. The gap between the shaft housing 2 and the gear shaft 4 can be sealed over to prevent ingress of dust and other contaminants, for example the first radial bearing 16, by use of a seal such as seal 17. To enable the bevel gear barrel assembly 18 to be easily gripped for insertion or removal by a hand tool such as a wrench, the shaft housing 2 may comprise chamfers 20.

In the embodiments shown, the face of the gear head 5 further comprises a gear head recess 6 for location of a centre dowel 8 therein. The centre dowel 8 may itself be positioned within a recess of the box housing 1 to contribute to the alignment and support of the bevel gear 3 (and the bevel gear barrel assembly 18 more generally) within the box housing 1. To enable rotation of the gear head 5 against the centre dowel 8, bearings 11, 15 are located between the gear head 5 and the centre dowel 8. According to the embodiment shown, a second radial bearing 15 is located between an outer circumference of the centre dowel 8 and an inner circumference of the gear head recess 6. Further, a second axial bearing 11, surrounded by bearing washers 12, is located between the face of the gear head 5 and the box housing 1. A further shim washer 9 is placed between the second axial bearing 11 and the box housing as most clearly illustrated in FIG. 5.

In the embodiment shown, each of the axial roller bearings 13, 11 and the radial roller bearings 16, 15 are exemplified as needle roller bearings. However, other bearing configurations, including roller bearing configurations, may be utilised according to the invention.

Figure 6:
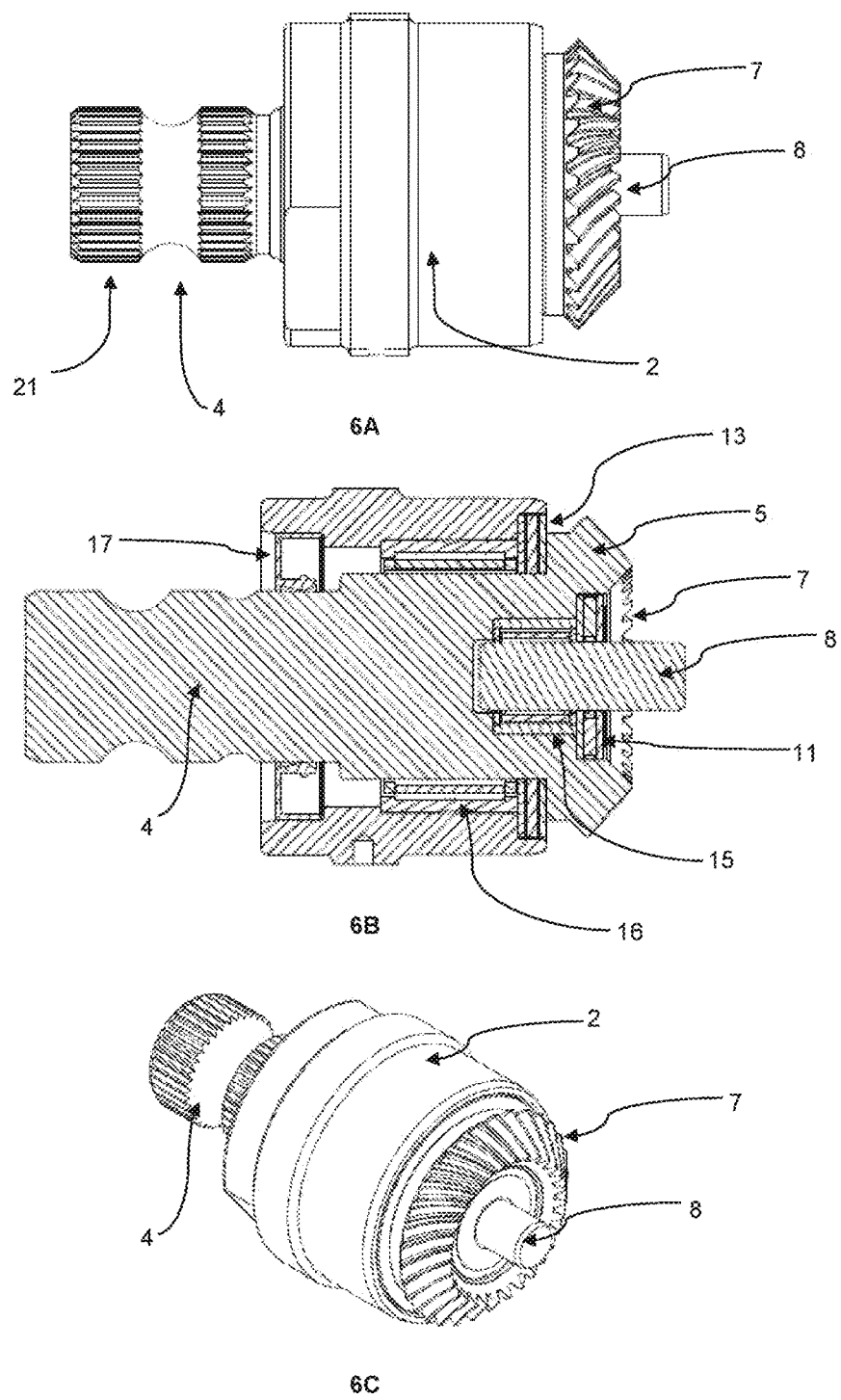
FIG. 6 shows a bevel gear barrel assembly for insertion into a bevel gear box according to an embodiment of the invention.

With reference to FIG. 6, a bevel gear barrel assembly 18 according to an embodiment of the invention is highlighted. The bevel gear barrel assembly 18 can be inserted and removed from box housing 1 as a pre-assembled item quickly and simply. To insert the bevel gear barrel assembly 18 into a box housing 1, the bevel gear barrel assembly 18 can simply be slid into a corresponding recess 19 in the box housing 1. Once appropriately located, the bevel gear barrel assembly 18 may be locked in position by insertion of a roll pin 10 or similar device, as shown in FIG. 3 to FIG. 5. Since the bevel gear 3 is pre-positioned in cooperation with bearings 11, 13, 15, 16 within the bevel gear barrel assembly, sophisticated efforts to align the bevel gear 3 within the box housing 1 can be avoided.

Figure 7:
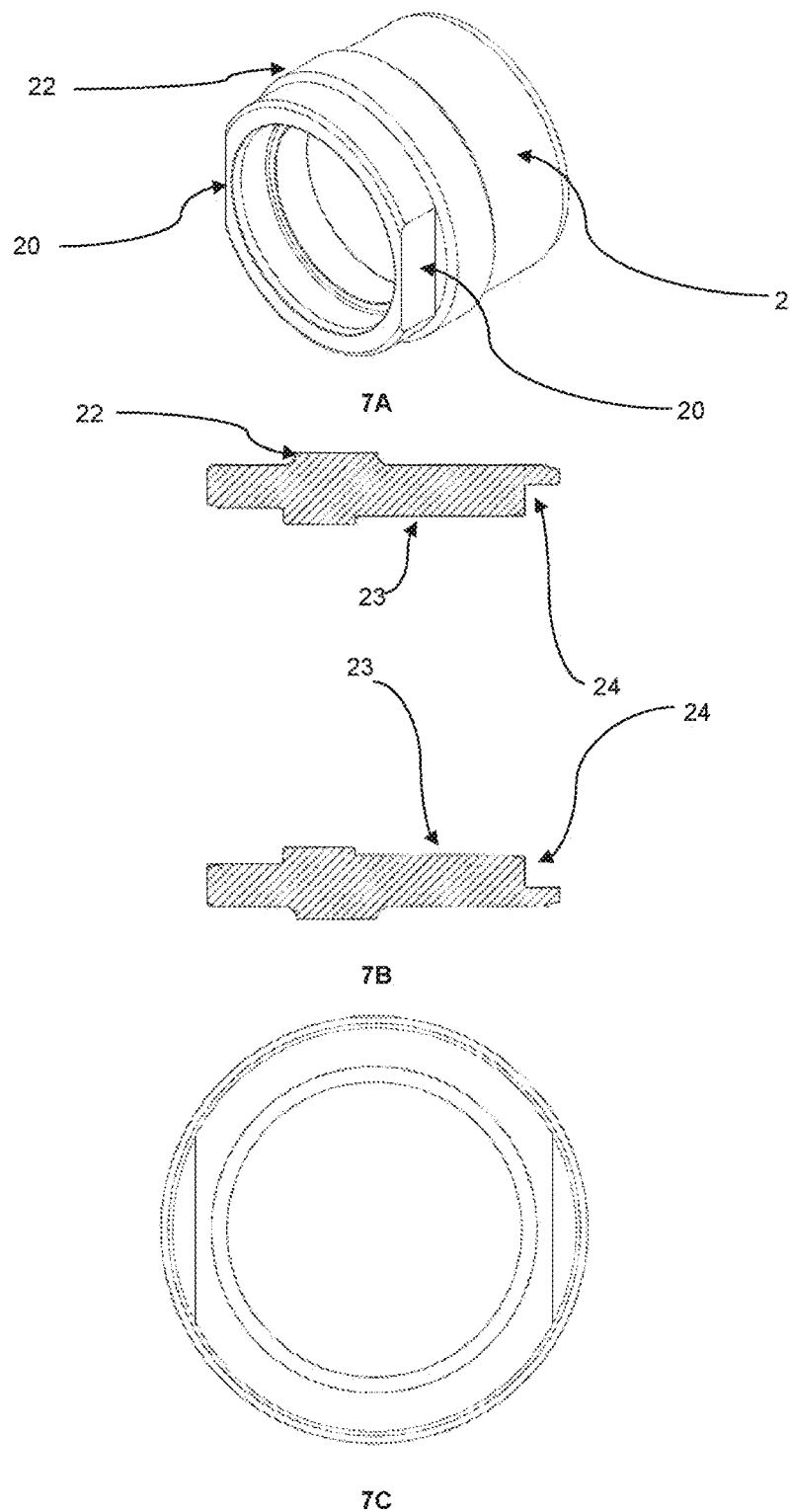
FIG. 7 shows a shaft housing for a bevel gear barrel assembly according to an embodiment of the invention.

FIG. 7 shows a shaft housing 2 according to embodiments of the invention. As shown the shaft housing 2 has a generally annular shape so as to fit around a circumference of the gear shaft 4. To prevent a bevel gear barrel assembly from being inserted too far within a box housing 1, the shaft housing incorporates an outer collar protrusion 22 configured to abut against a surface of the shaft housing 2 when the bevel gear barrel assembly has been inserted to a sufficient depth.

To enable appropriate location of a first radial bearing 16 between the shaft housing 2 and the gear shaft 4, the shaft housing 2 may comprise a first radial bearing recess 23. The first radial bearing recess may be accessed from a first side of the shaft housing, such that the first radial bearing 16 may be slid into the first radial bearing recess 23 from a first opening of the shaft housing 2, while preventing the first radial bearing 16 from sliding out the opposite opening of the shaft housing 2. The first radial bearing recess 23 may be sized to fit the entirety of the first radial bearing 16 therein. To enable appropriate placement and location of a first axial bearing 13 between the shaft housing 2 and gear head 5, the shaft housing 2 may further comprise a first axial bearing recess 24. The first axial bearing recess 24 is sized and located to ensure the first axial bearing 13 is appropriately positioned during installation, between the shaft housing 2 and gear head 5.

Figure 8:
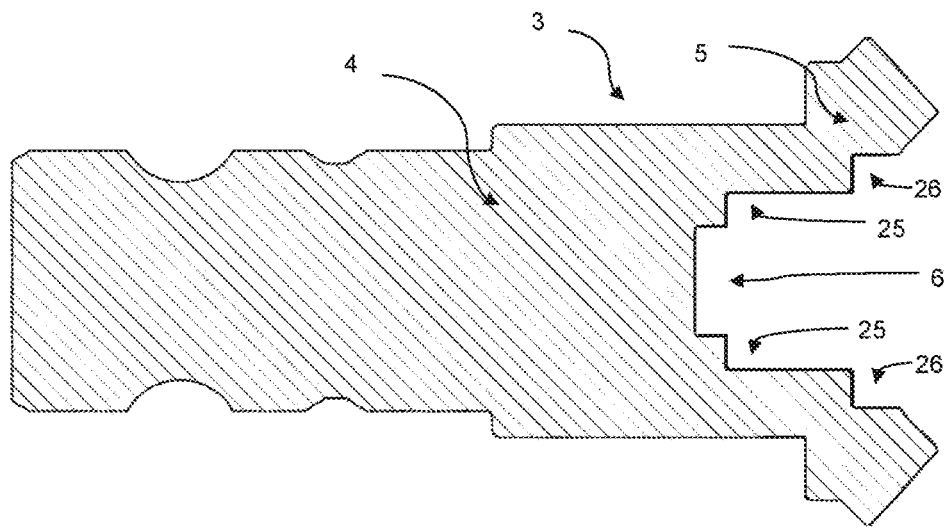
FIG. 8 shows a bevel gear according to an embodiment of the invention.
Figure 9:
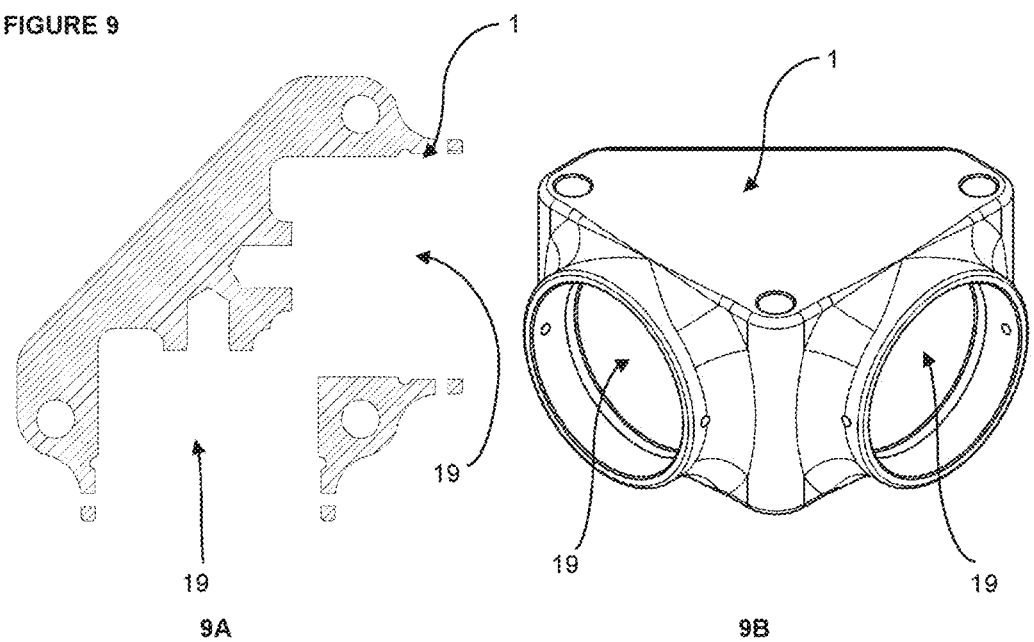
FIG. 9 shows a bevel gear box casing according to an embodiment of the invention.

FIG. 8 shows bevel gear 3 incorporating gear shaft 4 and gear head 5 according to embodiments of the invention. As shown, the gear head 5 may include a gear head recess 6 location of a centre dowel 8 therein. To ensure appropriate placement of bearings between the centre dowel 8 and the gear head recess 6, further bearing recesses may be provided in the gear head recess 6. As shown in FIG. 8, a second axial bearing recess 26 may be provided in the in the gear head recess 6 to locate a second axial bearing 11 between the gear head 5 and the box housing 1. Similarly, a second radial bearing recess may be provided in the gear head recess 6 to locate a second radial bearing 15 between the gear head 5 and the centre dowel 8. Positioning of bearings within bearing recesses according to embodiments of the invention is exemplified with reference to FIG. 4 and FIG. 6B.

In the embodiments shown, the first radial bearing recess 23 and the first axial bearing recess 24 are located in the shaft housing 2. Alternatively, the first radial bearing recess may be located in the gear shaft 4 or in both the shaft housing 2 and the gear shaft 4, while the first axial bearing recess may be located in the gear head 5 or in both the gear head 4 and the shaft housing 2. Similarly, the second radial bearing recess 25 may be located in the centre dowel 8 or in both the centre dowel 8 and the gear head recess 6, while the second axial bearing recess 26 may be located in the box housing 1 or in both the box housing 1 and the gear head recess 6.

According to certain embodiments, the invention can enable assembly of a bevel box with simple, easy alignment of bevel gears and bevel gear teeth. For example, a bevel gears can be positioned forward or back within a box housing 1 by use of, for example, bearing washers 12, 14 located within either the first axial bearing recess 24 or the second axial bearing recess 26. That is, to bring a bevel gear 3 further into a box housing, bearing washers 14 may be located within the first axial bearing recess 24 (thereby pushing the gear head 5 away from the shaft housing 2). Similarly, to bring a bevel gear 3 further out from the box housing 1, bearing washers 12 may be located in the second axial bearing recess 26 (thereby pushing the gear head 5 away from the surface of the box housing 1 opposite the gear head 5). Such steps may be performed simply and easily without needing to access the internals of the box housing 1.

Simple, easy alignment of bevel gears 3 in turn opens further opportunities to improve performance characteristics of the bevel box. As shown in FIG. 6 in particular, each bevel gear 3 may utilise spiraled teeth 7 to improve meshing between bevel gears 3 and thereby reduce drag, noise and vibration in comparison to straight teeth, and otherwise to generally improve smoothness of operation. In the embodiment shown, each bevel gear 3 may possess the same number of gear teeth 7, thereby providing a gear ratio of 1:1. However a bevel box may provide other gear ratios, as conceivable by a person skilled in the art.

Figure 2:
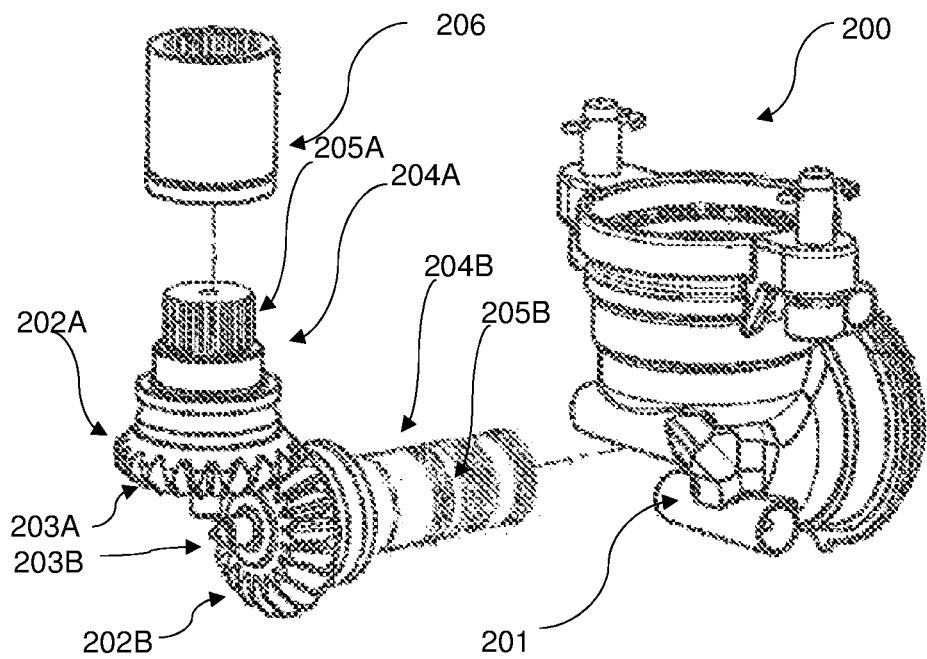
FIG. 2 shows an exploded view of a bevel gear box for a steering mechanism, as disclosed in U.S. Pat. No. 9,555,825 B2.

According to certain embodiments, the bevel box may be incorporated into the steering drive line of a vehicle (e.g. a commercial vehicle such as a truck, bus or van). As shown in FIG. 3 to FIG. 5 generally, each gear shaft 4 may be provided with a splined end 21 to enable connection within a steering shaft, such as by use of a coopering sleeve 206 as exemplified by prior art FIG. 2, or to a universal joint as exemplified by prior art FIG. 1.

It will be understood to persons skilled in the art of the invention that modifications may be made without departing from the spirit and scope of the invention. The embodiments and/or examples as described herein are therefore to be considered as illustrative and not restrictive.

The invention claimed is:

1. A bevel gear barrel assembly for insertion into a bevel gear box, the barrel assembly comprising:
   a bevel gear, the bevel gear further comprising a gear head incorporating gear teeth, and a gear shaft extending from the gear head;
   a shaft housing surrounding a circumference of the gear shaft;
   a first radial bearing, the first radial bearing located between the gear shaft and the shaft housing; and
   a first axial bearing, the first axial bearing located between the gear head and the shaft housing.

2. The barrel assembly according to claim 1, wherein the shaft housing comprises a first radial bearing recess for locating the first radial bearing at least partially therein.

3. The barrel assembly according to claim 1, wherein the first radial bearing comprises a roller bearing.

4. The barrel assembly according to claim 1, wherein the shaft housing comprises a first axial bearing recess for locating the first axial bearing at least partially therein.

5. The barrel assembly according to claim 1, wherein the first axial bearing comprises a roller bearing.

6. The barrel assembly according to claim 1, wherein the shaft housing comprises a collar projection about a circumference of the shaft housing to limit insertion of the bevel gear barrel assembly into a bevel gear box.

7. The barrel assembly according to claim 1, wherein the gear head comprises a gear head face surrounded by the gear teeth, and further wherein the gear head face comprises a gear head recess enabling a center dowel to be inserted therein.

8. The barrel assembly according to claim 7, the barrel assembly further comprising:
   the center dowel located in the gear head recess; and
   a second radial roller bearing, the second radial roller bearing located between a circumference of the center dowel and the gear head recess.

9. The barrel assembly according to claim 8, wherein the gear head recess comprises a second radial roller bearing recess for locating the second radial roller bearing at least partially therein.

10. The barrel assembly according to claim 8, wherein the second radial roller bearing comprises a needle roller bearing.

11. The barrel assembly according to claim 8, wherein the barrel assembly comprises a second axial bearing surrounding a circumference of the center dowel and contacting the gear head face.

12. The barrel assembly according to claim 11, wherein the gear head recess comprises a second axial bearing recess for locating the second axial bearing at least partially therein.

13. The barrel assembly according to claim 11, wherein the second axial bearing comprises a roller bearing.

14. The barrel assembly according to claim 1, the barrel assembly comprising a seal configured to seal between the gear shaft and the shaft housing, at the opposite end of the shaft housing to the gear head.

15. The barrel assembly according to claim 1, wherein the gear head comprises angled gear teeth.

16. The barrel assembly according to claim 15, wherein the gear head comprises spiraled gear teeth.

17. The barrel assembly according to claim 1, wherein a pitch angle of the gear teeth is between 30°-60°.

18. The barrel assembly according to claim 1, wherein the barrel assembly is configured to slide into a box casing of the bevel gear box.

19. A box casing for the bevel gear box, the box casing comprising at least two barrel recesses, each barrel recess configured for insertion therein of the barrel assembly according to claim 1.

20. The box casing according to claim 19, wherein the at least two barrel recesses are set at 45°-135° with respect to one another.

21. The box casing according to claim 19, wherein the box casing is configured to lock a barrel assembly inserted into a barrel recess in place.

22. The box casing according to claim 21, where the box casing an aperture for insertion therein of a locking pin.

23. A bevel gear box comprising:
a box casing comprising at least two barrel recesses, each barrel recess configured for insertion therein of a barrel assembly; and
two bevel gear barrel assemblies according to claim 1, wherein each bevel gear barrel assembly is inserted into a respective barrel recess of the box casing.

24. The bevel gear box according to claim 23, wherein the bevel gears of each bevel gear barrel assembly possess a gear ratio of 1:1 with respect to one another.

25. A method of producing a bevel gear box, the method comprising:
locating a box casing comprising at least two barrel recesses, each barrel recess configured for insertion therein of a barrel assembly each comprising:
a bevel gear, the bevel gear further comprising a gear head incorporating gear teeth, and a gear shaft extending from the gear head;
a shaft housing surrounding a circumference of the gear shaft;
a first radial bearing, the first radial bearing located between the gear shaft and the shaft housing; and
a first axial bearing, the first axial bearing located between the gear head and the shaft housing;
inserting a first of the bevel gear barrel assemblies into a first of the barrel recesses of the box casing; and
inserting a second of the bevel gear barrel assemblies into a second of the barrel recesses of the box casing.

26. The method of producing a bevel gearbox according to claim 25, wherein:
inserting the first of the bevel gear barrel assemblies into the first of the barrel recesses comprises sliding the first of the bevel gear barrel assemblies into the first of the barrel recesses; and
inserting the second of the bevel gear barrel assemblies into the second of the barrel recesses comprises sliding the first of the bevel gear barrel assemblies into the first of the barrel recesses.

27. The method of producing a bevel gear box according to claim 25, further comprising:
locking the first of the bevel gear barrel assemblies into the first of the barrel recesses; and
locking the second of the gear barrel assemblies into the second of the barrel recesses.

28. A steering drive line of a vehicle incorporating the bevel gear box according to claim 23.

* * * * *